Aug. 23, 1932.                E. MECHAU                1,873,778

FILM FEEDING MECHANISM

Filed March 27, 1931

Inventor:
Emil Mechau,
by Charles E. Mullen
His Attorney.

Patented Aug. 23, 1932

1,873,778

UNITED STATES PATENT OFFICE

EMIL MECHAU, OF SUDENDE, BRUNSWICK, GERMANY, ASSIGNOR TO GENERAL ELECTRIC COMPANY, A CORPORATION OF NEW YORK

FILM FEEDING MECHANISM

Application filed March 27, 1931, Serial No. 525,731, and in Germany April 15, 1930.

My invention relates to film feeding mechanism having a sprocket adapted to engage the sprocket tooth openings in a film of the motion picture type. It is well known to those skilled in the art that the films in common use at the present time for the production of motion pictures and for the reproduction of recorded sound undergo considerable shrinkage due largely to aging of the film and that this shrinkage is excessive results in improper sprocket tooth action. When used in the customary manner such a film is subjected to an unnecessary amount of wear and is irregular in its movement. This lack of smoothness or uniformity in movement is particularly objectionable where as in the case of sound reproducing apparatus, a high degree of uniformity of film movement is essential to good sound reproduction.

It is the object of my invention to provide an improved film feeding mechanism whereby the objectionable effects incident to changes in the length of the film, such as that due to shrinkage, are avoided.

My invention will be better understood from the following description taken in connection with the accompanying drawing, and its scope will be pointed out in the appended claims.

Figure 1:
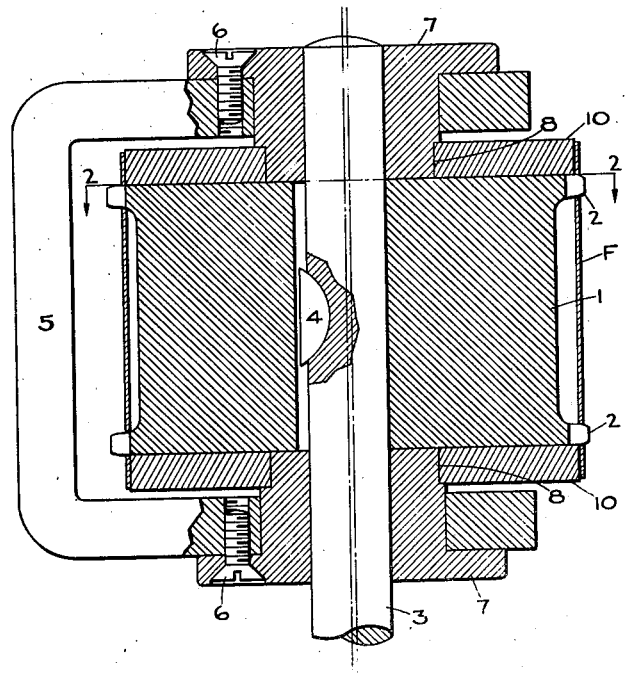
Figure 2:
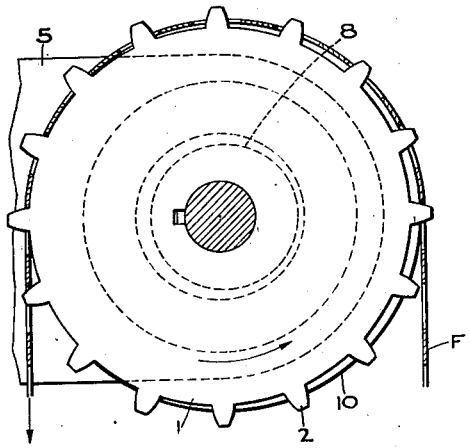
Figure 3:
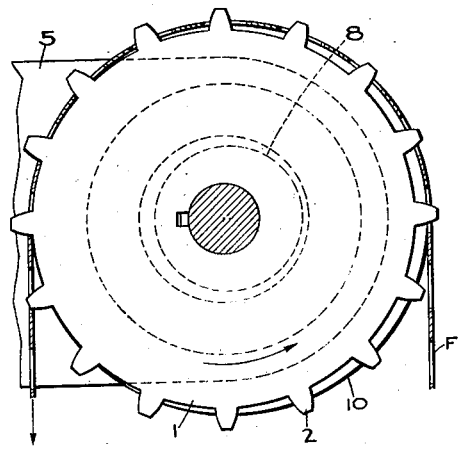

Referring to the drawing, Fig. 1 is a longitudinal cross-section of apparatus embodying my invention; Figs. 2 and 3 are transverse cross-sections taken on the line 2—2 of Fig. 1, the former showing a new film in engagement with the sprocket, and the latter showing a shrunken film in engagement therewith.

In the drawing, the sprocket 1 having two rows 2 of teeth adapted to engage in the sprocket tooth openings of a film F of the motion picture type is secured to the shaft 3, for example, by the key 4. The sprocket is shown by way of illustration as mounted in the U bracket 5. Secured to the two arms of this bracket, for example, by the set screws 6, are the members 7 which form bearings for the shaft 3 at each side of the sprocket. These bearing members 7 are each provided with a circular bearing face 8 which is slightly eccentric to the shaft 3. On these eccentric bearing faces 8 are rotatably mounted the circular disks 10 which lie closely adjacent to the opposite side faces of the sprocket. The outer periphery of each of these disks 10 is circular and is concentric with the inner bearing face 8. The amount of eccentricity and the external diameter of these disks are, as shown in Figs. 2 and 3, such that at one point, namely where the film is adapted to leave the sprocket, the outer periphery is flush with the bottom of the teeth while at the diametrically opposite point it is slightly below the tops of the teeth. The function of the rings 10 is to support the film while it is in engagement with the sprocket teeth. When a new or unshrunken film is being used the film is driven by the sprocket teeth near the point at which it first begins contact with the sprocket as clearly shown in Fig. 2. When a badly shrunken film is threaded on the sprocket, the film is driven by teeth near the point where the film is leaving the sprocket as clearly shown in Fig. 3. For films that have an intermediate value of shrinkage the driving point will lie at some intermediate part of the sprocket depending upon the amount of shrinkage. As a result of this construction it will be seen that there is no slipping of the film on the teeth of the sprocket, such as commonly occurs in apparatus in common use at the present time. Hence the film is driven with greater uniformity than heretofore and all vibration due to improper sprocket tooth action is avoided.

I have chosen the particular embodiment described above as illustrative of my invention and it will be apparent that various other modifications may be made without departing from the spirit and scope of my invention which modifications I aim to cover by the appended claims.

What I claim as new and desire to secure by Letters Patent of the United States, is:—

1. Film feeding mechanism comprising a sprocket adapted to engage the film, and rotatable means adjacent the sprocket arranged to support the film at progressively varying distances from the axis of the sprocket.

2. Film feeding mechanism comprising a sprocket and rotatable film supporting means adjacent the sprocket constructed progressively to vary the depth of intersection of the sprocket teeth and the film.

3. Film feeding mechanism comprising a sprocket and a rotatable film engaging member arranged to hold the film during its engagement with the sprocket at a varying radial distance from the axis thereof.

4. Film feeding mechanism comprising a sprocket, and a circular rotatable member mounted eccentrically to the sprocket for supporting the film adjacent thereto.

5. Film feeding mechanism comprising a sprocket having a plurality of rows of teeth, a rotatable film supporting member adjacent each of said rows, and means for mounting said members eccentrically of said sprocket.

6. Film feeding mechanism comprising a shaft, a sprocket thereon having a row of teeth at each side thereof, a film supporting disk at each side of the sprocket, and bearing members for the shaft having eccentric bearings for said disks.

In witness whereof, I have hereto set my hand this 10th day of March, 1931.

EMIL MECHAU.